(12) United States Patent
Yao et al.

(10) Patent No.: US 11,572,932 B2
(45) Date of Patent: Feb. 7, 2023

(54) COUPLING STRUCTURE AND MODULARIZED COAXIAL GEAR TRAIN REDUCTION MECHANISM USING SAME

(71) Applicant: Li-Ho Yao, Taipei (TW)

(72) Inventors: Li-Ho Yao, Taipei (TW); Norman Lien, Taipei (TW); Pei-Sheng Hsieh, Taipei (TW); Chi-Chen Tien, Taipei (TW); Pi-Jen Hsieh, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/560,137

(22) Filed: Dec. 22, 2021

(65) Prior Publication Data

US 2022/0196119 A1 Jun. 23, 2022

(30) Foreign Application Priority Data

Dec. 23, 2020 (TW) ................................. 109145752

(51) Int. Cl.

| F16H 57/023 | (2012.01) |
|---|---|
| F16H 1/46 | (2006.01) |
| F16C 3/02 | (2006.01) |
| F16D 1/06 | (2006.01) |
| F16H 57/021 | (2012.01) |
| F16H 57/08 | (2006.01) |
| F16H 1/28 | (2006.01) |

(52) U.S. Cl.
CPC .................. *F16H 1/46* (2013.01); *F16C 3/02* (2013.01); *F16D 1/06* (2013.01); *F16H 57/021* (2013.01); *F16H 57/082* (2013.01); *F16H 2001/2872* (2013.01); *F16H 2057/085* (2013.01)

(58) Field of Classification Search
CPC ................................. F16H 1/46; F16H 57/023
See application file for complete search history.

(56) References Cited

U.S. PATENT DOCUMENTS

| 5,167,478 | A | * | 12/1992 | Ramunas | .......... B23B 31/20125 |
|---|---|---|---|---|---|
| | | | | | 408/239 R |
| 5,168,774 | A | * | 12/1992 | Andra | ...................... F16D 1/064 |
| | | | | | 464/89 |
| 5,195,241 | A | * | 3/1993 | Bradfield | ................ F16H 55/36 |
| | | | | | 72/356 |
| 9,879,729 | B2 | * | 1/2018 | Hesse | ........................ F16D 1/10 |
| 10,767,671 | B2 | * | 9/2020 | Tamura | ...................... F16J 1/12 |

(Continued)

*Primary Examiner* — Derek D Knight
(74) *Attorney, Agent, or Firm* — Leong C. Lei

(57) ABSTRACT

A coupling structure includes a shaft, a tube, and a connection assembly. An end of the shaft is formed with a plurality of axial insertion troughs extended in an axial direction and arranged in an alternate manner. The tube includes a penetration-axle hole formed in a center thereof and corresponding to the penetration-axle section of the shaft. A plurality of radial insertion troughs, in the form of a recessed surface, are formed in an inner circumferential surface of the penetration-axle hole of the tube. The connection assembly includes a coupling block that has an outer circumference formed with a plurality of radial insertion blocks corresponding to the radial insertion troughs of the tube and a plurality of axial insertion blocks corresponding to the axial insertion troughs of the shaft, so that a fastening member may be used to selectively fasten the coupling block between the shaft and the tube.

24 Claims, 5 Drawing Sheets

(56) References Cited

U.S. PATENT DOCUMENTS

2003/0108384 A1* 6/2003 Huang ............... B21K 1/30
  403/383
2020/0386153 A1* 12/2020 Daimer ............... F04D 29/20

* cited by examiner

COUPLING STRUCTURE AND MODULARIZED COAXIAL GEAR TRAIN REDUCTION MECHANISM USING SAME

TECHNICAL FIELD OF THE INVENTION

The present invention relates to a coupling, and more particularly to an improved structure of a coupling and a modularized gear train reduction mechanism using the coupling structure.

DESCRIPTION OF THE PRIOR ART

A known structure of planetary fashion gears includes a sun gear mounted to a transmission shaft and at least one carrier frame that supports multiple planetary gears circumferentially around and in mesh with an outer circumference of the sun gear, so that an effect of speed reduction can be realized by means of a gear ratio between the sun gear and the peripheral planetary gears. However, due to the torque as transmitted thereby is greater than general motor driving, connection between the sun gear and the transmission shaft needs to be of a relatively high strength, and consequently, it is common, heretofore, to form the sun gear, through proper machining, on the transmission shaft as an integrated, one-piece structure. This, however, increases the complication of machining for the entire transmission shaft. Further, the structure has to be entirely abandoned and replaced if a part thereof is machined erroneously or requires repairing. This causes undesired waste. Further, the known reduction mechanism is made by assembling parts on the transmission shaft and the sun gear in a piece by piece manner, and is thus suffering issues of assembling being sophisticated and working processes being increased, so that accuracy and concentricity thereof, as being so assembled, would be affected, leading to various situations, such as unsecured assembly and poor meshing engagement, which consequently cause problems of generation of noises in operation and a poor efficiency of transmission.

SUMMARY OF THE INVENTION

The primary objective of the present invention is to provide a coupling structure, which enable a shaft and a tube that are separate parts to couple to each other simultaneously in both an axial direction and a radial direction, so as to greatly increase the coupling strength thereof to suit the needs for driving with a large torque.

Further, the primary objective of the present invention is also to provide a modularized coaxial gear train reduction mechanism that uses the coupling structure, so that a major portion of parts can be modularized for easing assembling, serving and replacing, and inventory management of the reduction mechanism, and to enhance concentricity of the reduction mechanism after being assembled, and to make the entire assembled structure of the reduction mechanism more secured and stable, and to enhance the degree of meshing engagement to help reduce vibration and noise generated by the operation thereof and extend the service life thereof and also to enhance transmission efficiency.

DETAILED DESCRIPTION OF THE PREFERRED EMBODIMENT

Figure 1:
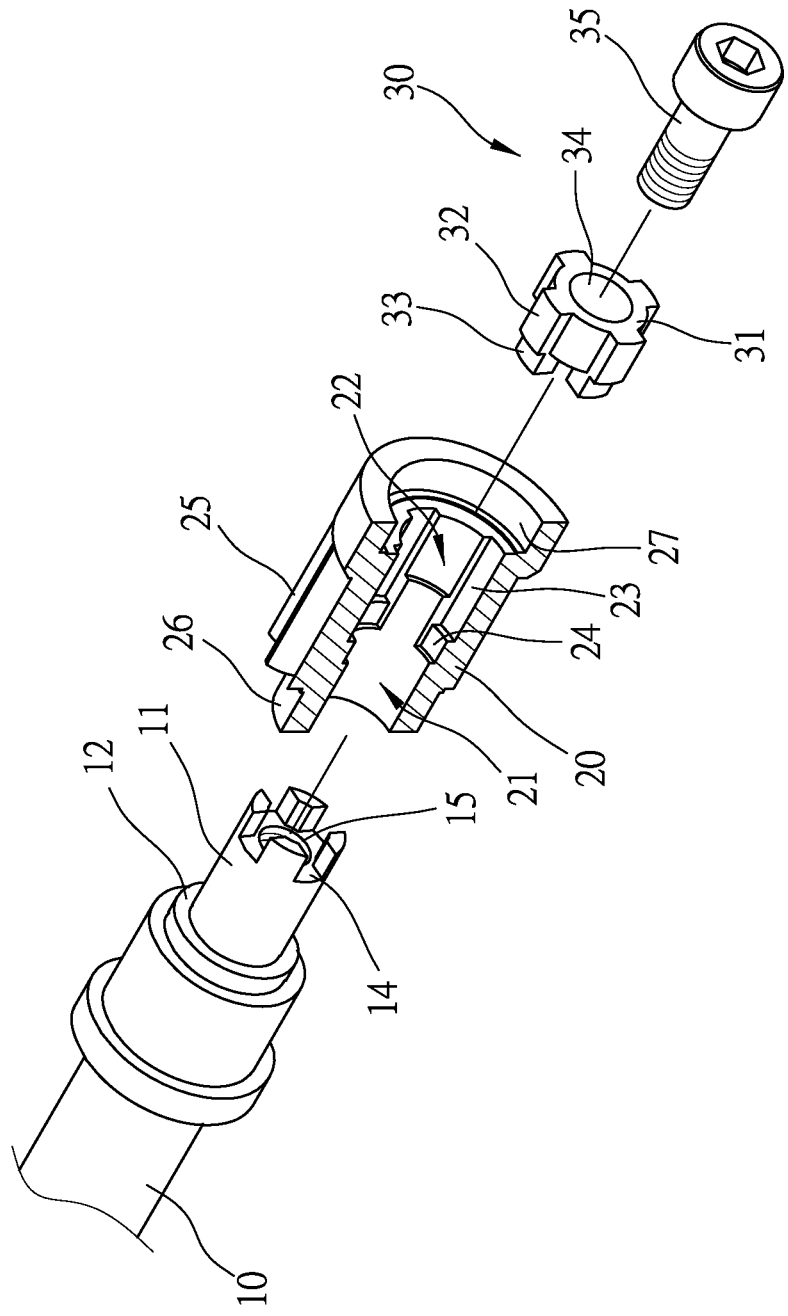
FIG. 1 is an exploded view showing a coupling structure according to the present invention.
Figure 2:
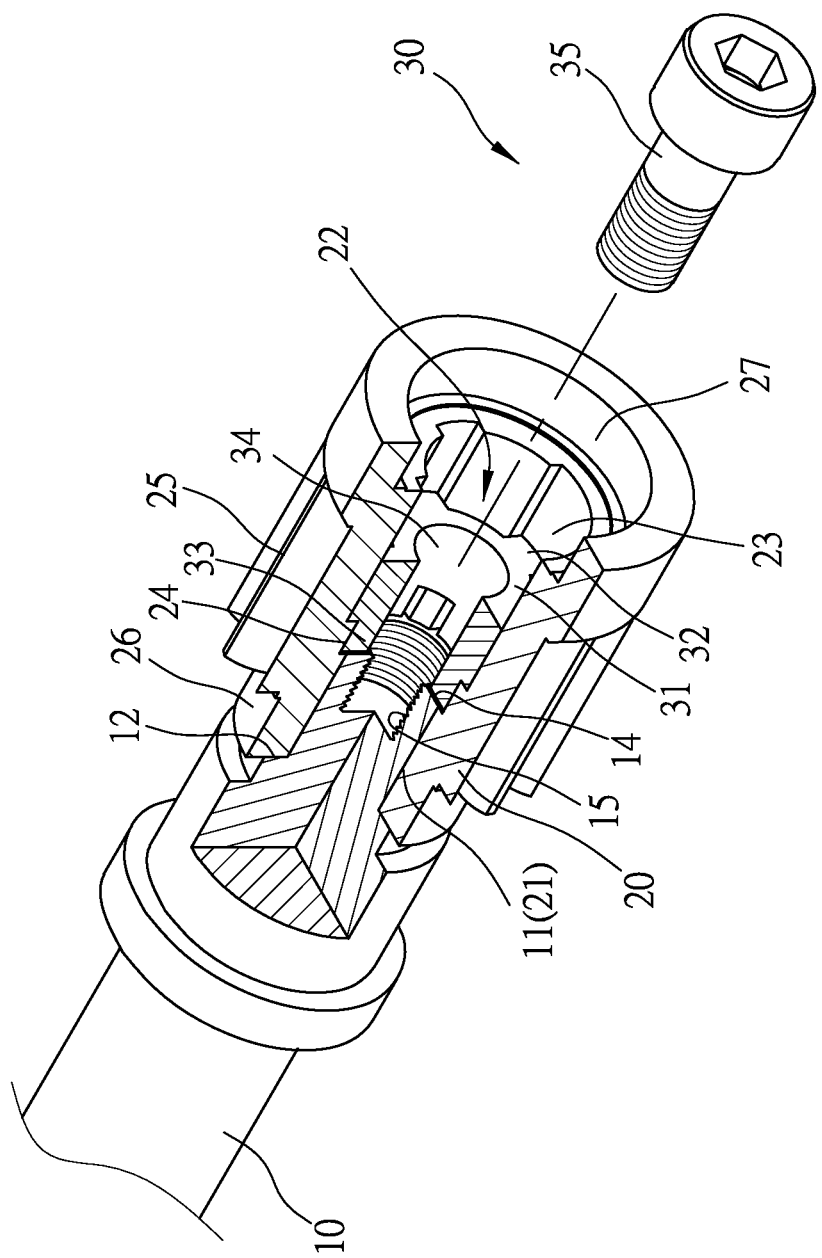
FIG. 2 is a perspective view, partly in sectioned form, showing the coupling structure of the present invention in a condition before being assembled.

The present invention provides a coupling structure that is constructed, as shown in FIGS. 1 and 2, as being formed of a shaft 10, a tube 20 fit over the shaft 10, and a connection assembly 30 connecting the shaft 10 and the tube 20 together.

The shaft 10 is a transmission shaft, such as a sun gear transmission shaft of a reduction mechanism. The shaft 10 comprises a penetration-axle section 11, and the shaft 10 includes a positioning stepped surface 12 formed along an outer circumference of the penetration-axle section 11 for axial positioning of the tube 20. Further, an end of the penetration-axle section 11 of the shaft 10 is formed with a plurality of axial insertion troughs 14 that are extended in an axial direction and arranged in an alternate manner. Further, a surface of the end of the penetration-axle section 11 of the shaft 10 is formed, in a center thereof, with a threaded locking hole 15.

Further, the tube 20 comprises a penetration-axle hole 21 formed in a center thereof and corresponding to the penetration-axle section 11 of the shaft 10. An insertion engagement section 22 is provided in the penetration-axle hole 21 at an end thereof that is opposite to the shaft 10. A plurality of radial insertion troughs 23, in the form of a recessed surface, are formed in an inner circumferential surface of the insertion engagement section 22. Each of the radial insertion troughs 23 is provided, at an end thereof, with a stepped portion 24 that is relatively shallow. According to some embodiments, when the tube 20 is arranged to serve as a transmission member, such as a sun gear of reduction mechanism, the tube 20 may be formed, on an outer circumference thereof, with a plurality of engagement teeth 25, and two ends of the tube 20 are each formed with a bearing seat 26, 27 to receive a bearing disposed thereon.

The connection assembly 30 comprises a coupling block 31 and a fastening member 35, wherein the coupling block 31 is insertable into the insertion engagement section 22 of the penetration-axle hole 21 of the tube 20. The coupling block 31 has an outer circumference that comprises a plurality of radial insertion blocks 32 that correspond to the radial insertion troughs 23 of the insertion engagement section 22. The coupling block 31 has an end surface that comprises a plurality of axial insertion blocks 33 that are corresponding to, and insertable into and in retaining engageable with, the axial insertion troughs 14 of the penetration-axle section 11, wherein the axial insertion blocks 33 may be arranged to be in alignment with the radial insertion blocks 32, respectively, such that outer surfaces of the axial insertion blocks 33 can be simultaneously inserted into and retained in the stepped portions 24 of the radial insertion troughs 23 of the insertion engagement section 22 to enhance the effect of insertion and retention. Further, the coupling block 31 is formed, in a center thereof, with a through hole 34 to receive the fastening member 35 to penetrate therethrough and press thereon, such that an end of the fastening member 35 may be selectively screwed into and tightened in the threaded locking hole 15 of the shaft 10 to have the coupling block 31 fit between and pressed between the insertion engagement section 22 of the tube 20 and the penetration-axle section 11 of the shaft 10.

As such, a coupling structure capable of inserting and fitting simultaneously in an axial direction and a radial direction for positioning is constructed.

Figure 3:
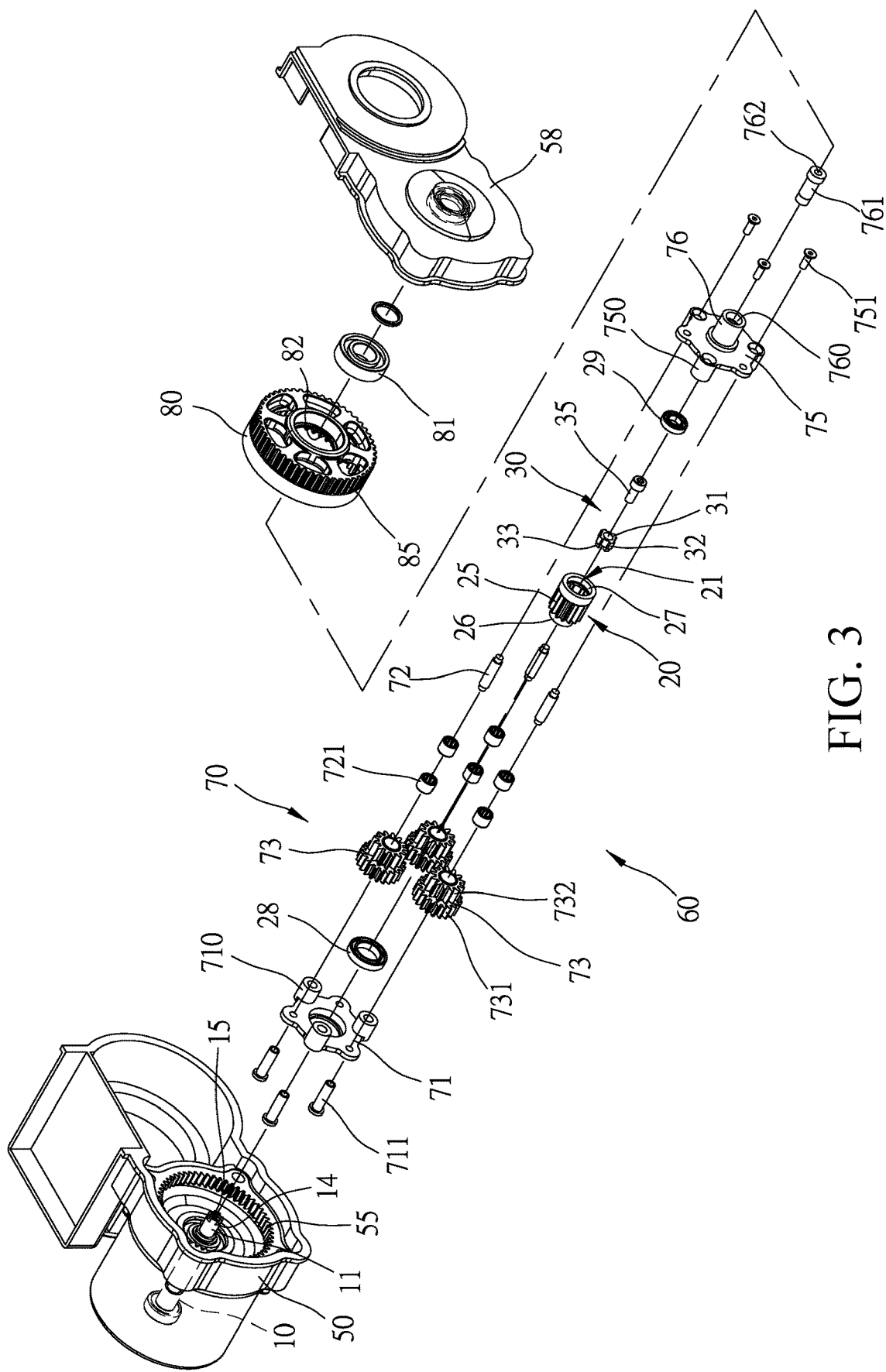
FIG. 3 is an exploded view showing the coupling structure of the present invention used in a modularized coaxial gear train reduction mechanism.
Figure 4:
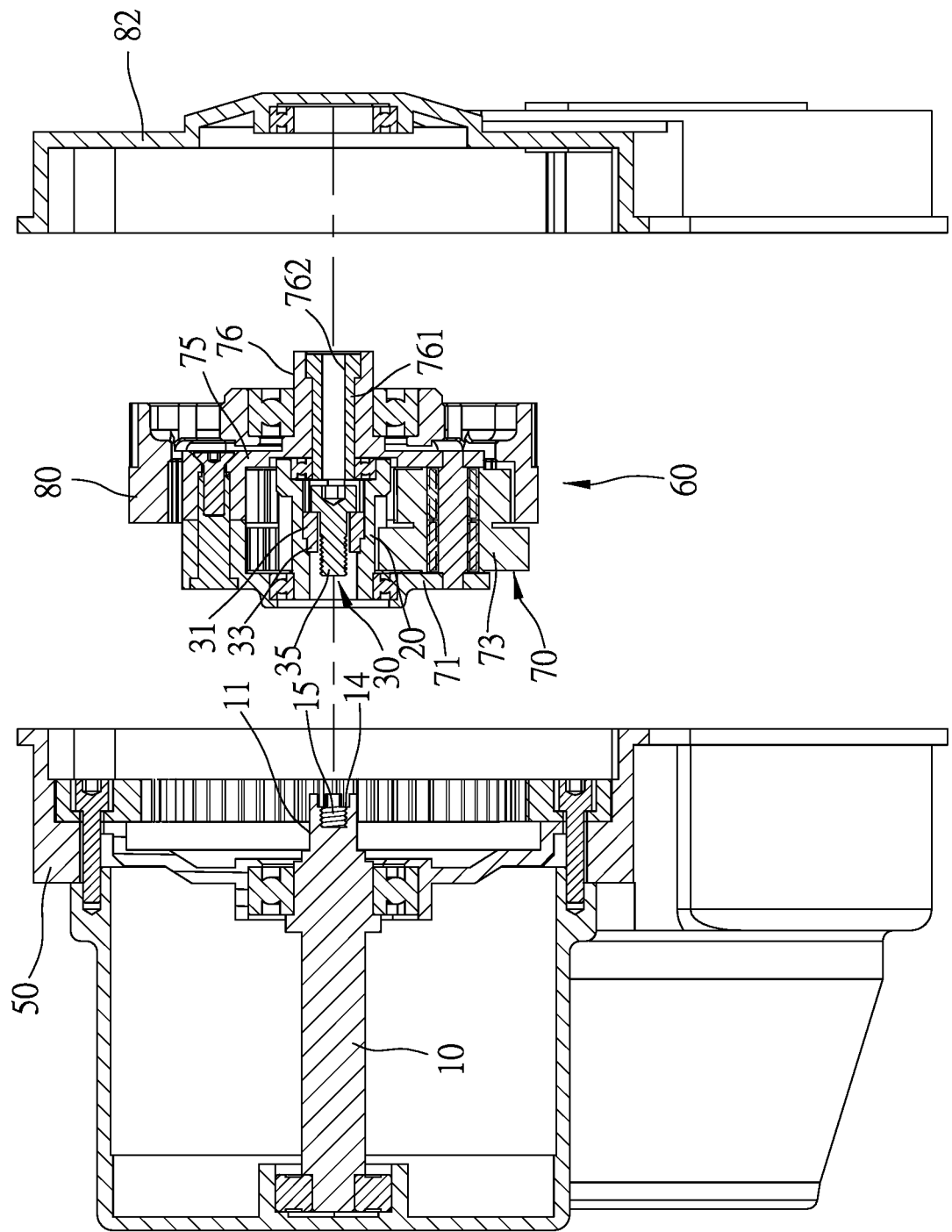
FIG. 4 is a cross-sectional view showing the coupling structure of the present invention used in a modularized coaxial gear train reduction mechanism in a condition of being not yet assembled together.
Figure 5:
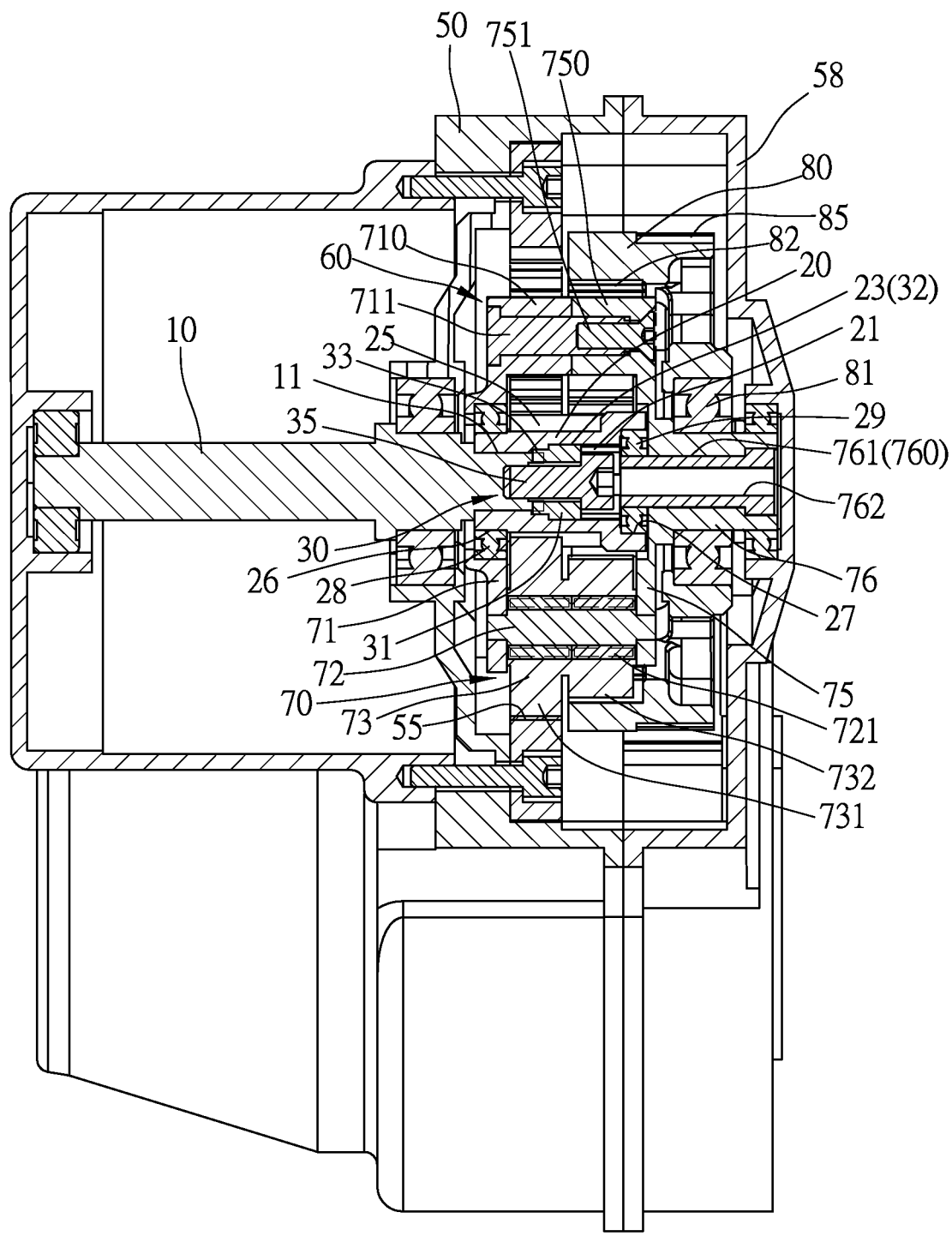
FIG. 5 is a cross-sectional view showing the coupling structure of the present invention used in a modularized coaxial gear train reduction mechanism in a condition of being assembled together.

The coupling structure according to the present invention is applicable in a modularized coaxial gear train reduction mechanism. As shown in FIGS. 3, 4, and 5, the reduction mechanism comprises a housing 50, a shaft 10 arranged at a center of the housing 50 to serve as a transmission shaft, an internal toothed ring 55 arranged on an inner circumference of the housing 50, and a coaxial gear train 60 arranged between the shaft 10 and the internal toothed ring 55, wherein a cover 58 is attached to and closes an end of the housing 50.

The coaxial gear train 60 comprises a tube 20 that includes engagement teeth 25 to serve as a sun gear, a planetary gear assembly 70, and an output member 80. The tube 20 that serves as the sun gear is mounted in the shaft 10 that serves as the transmission shaft by means of a coupling block 31 and a fastening member 35 of a connection assembly 30 (as shown in FIG. 5). The planetary gear assembly 70 is rotatably mounted to the tube 20 that serves as the sun gear by means of a first bearing 28 and a second bearing 29 received on the bearing seats 26, 27 at two ends of the tube 20. The planetary gear assembly 70 comprises a first carrier frame 71 and a second carrier frame 75 that are respectively arranged at two ends thereof and positioned on the first and second bearings 28, 29 and a plurality of stepped planetary gears 73 that mesh with and are arranged circumferentially around the tube 20, wherein the second carrier frame 75 comprises a shaft tube 76 arranged in a center thereof for supporting the output member 80 thereon. Further, a free end of the shaft tube 76 is rotatably mounted to the cover 58 by means of a bearing (FIG. 5). The shaft tube 76 of the second carrier frame 75 comprises a stepped mounting hole 760 formed in a center thereof, for receiving an end of a mounting axle 761 to penetrate therethrough and pressing thereon. Also, an end of the mounting axle 761 is mounted, by means of the second bearing 29, to an opposite end of the tube 20, wherein the mounting axle 761 comprises a through hole 762, for receiving a hand tool to extend therethrough for manipulating the fastening member 35 of the coupling block 31 of the connection assembly 30. The first and second carrier frames 71, 75 are formed, on surfaces thereof that face each other, with a plurality of counterbored hole pillars 710, 750 that abut each other to respectively receive, in a penetrating manner, threaded fastener members 711, 751 that are mutually fastened to each other so as to have the first and second carrier frames 71, 75 of the planetary gear assembly 70 to join to and combine with each other as a unitary structure. A plurality of shaft bars 72 are arranged between the first and second carrier frames 71, 75 for respectively supporting the stepped planetary gears 73 thereon. Each of the shaft bars 72 rotatably supports one of the stepped planetary gears 73 corresponding thereto by means of at least one bearing 721, such that each individual one of the stepped planetary gears 73 is rotatably mounted between the first and second carrier frames 71, 75. Each of the stepped planetary gears 73 comprises a first toothed portion 731 that meshes, simultaneously, with the engagement teeth 25 of the tube 20 that serve as the sun gear and the internal toothed ring 55 (as shown in FIG. 5). Each of stepped planetary gears 73 in provided, at one side of the first toothed portion 731 with a second toothed portion 732 that is integrally formed therewith and in meshing engagement with the output member 80 (as shown in FIG. 5). The output member 80 is rotatably supported, by means of a third bearing 81, on the shaft tube 76 of the second carrier frame 75 of the planetary gear assembly 70. The output member 80 is provided, on an inner circumference thereof, with an internal toothed circumference 82 that meshes with the second toothed portions 732 of the stepped planetary gears 73 of the planetary gear assembly 70, and also, the output member 80 is provided, on an outer circumference thereof, with a driving toothed portion 85 for meshing engagement with an object to be driven thereby (not shown in the drawings).

An actual operation of the coupling structure according to the present invention will be described. As shown in FIGS. 3, 4, and 5, the tube 20 of the coaxial gear train 60 that serves as the sun gear is mounted, by means of the penetration-axle hole 21, to the penetration-axle section 11 of the shaft 10 that serves as the transmission shaft, and the coupling block 31 that is inserted into and fit in the tube 20 is mounted by having the axial insertion blocks 33 inserted into and in mutual retaining engagement with the axial insertion troughs 14 of the penetration-axle section 11, and the fastening member 35 is manipulated to press against the coupling block 31 and screw into the threaded locking hole 15 of the penetration-axle section 11 of the shaft 10, so that the coaxial gear train 60, in the entirety thereof, is attached to the shaft 10 that serves as the transmission shaft to thereby enable the tube 20 that serves as the sun gear in the coaxial gear train 60 to couple to the shaft 10 that serves as the transmission shaft simultaneously in the axial direction and the radial direction to suit the needs for driving with a large torque.

Based on the arrangement and description provided in the previous, the coupling structure according to the present invention makes the radial insertion blocks 32 and the axial insertion blocks 33 of the coupling block 31 of the connection assembly 30 to fit into and be set in retaining engagement with the tube 20 and the shaft 10 at the same time, so as to have the shaft 10 and the tube 20 that are separate parts to couple to each other simultaneously in both the axial direction and the radial direction, thereby greatly increasing the coupling strength to suit the needs for driving with a large torque and also, in case of being used with a reduction mechanism, to enable modularization of the coaxial gear train 60 thereof for easing assembling, serving and replacing, and inventory management of the reduction mechanism, and to enhance concentricity of the reduction mechanism after being assembled, and to make the entire assembled structure of the reduction mechanism more secured and stable, and to enhance the degree of meshing engagement to help reduce vibration and noise generated by the operation thereof and extend the service life thereof and also to enhance transmission efficiency.

We claim:
1. A coupling structure, comprising:
 a shaft, which comprises a penetration-axle section, the penetration-axle section of the shaft having an end that is formed with a plurality of axial insertion troughs that are extended in an axial direction and arranged in an alternate manner, a threaded locking hole being formed in a center of a surface of an end of the penetration-axle section of the shaft;

a tube, which comprises a penetration-axle hole formed in a center thereof and corresponding to the penetration-axle section of the shaft, an insertion engagement section being formed in the penetration-axle hole of the tube at an end thereof that is opposite to the shaft, wherein a plurality of radial insertion troughs, in the form of a recessed surface, are formed in an inner circumferential surface of the insertion engagement section; and a connection assembly, which comprises a coupling block and a fastening member, the coupling block being disposed in the insertion engagement section of the penetration-axle hole of the tube, the coupling block having an outer circumference that comprises a plurality of radial insertion blocks corresponding to the radial insertion troughs of the tube, the coupling block having an end surface that comprises a plurality of axial insertion blocks corresponding to the axial insertion troughs of the shaft, the coupling block being formed, in a center thereof, with a through hole to receive the fastening member to penetrate therethrough and press thereon, an end of the fastening member being selectively screwed into and tightened in the threaded locking hole of the shaft;

wherein the coupling block is fit between and pressed between the insertion engagement section of the tube and the penetration-axle section of the shaft to achieve insertion and engagement simultaneously in both an axial direction and a radial direction for positioning.

2. The coupling structure according to claim 1, wherein the shaft comprises a positioning stepped surface formed along an outer circumference of the penetration-axle section for axial positioning of the tube.

3. The coupling structure according to claim 1, wherein the axial insertion blocks of the coupling block of the connection assembly are arranged to be in alignment with the radial insertion blocks, respectively, and each of the radial insertion troughs is provided, at an end thereof, with a stepped portion that is relatively shallow such that outer surfaces of the axial insertion blocks are simultaneously insertable into and retained in the stepped portions of the radial insertion troughs of the insertion engagement section to enhance an effect of insertion and retention.

4. A modularized coaxial gear train reduction mechanism using the coupling structure according to claim 1, comprising:

a housing;

a shaft that serves as a transmission shaft and is rotatably mounted in the housing;

an internal toothed ring, which is mounted to the housing;

a coaxial gear train, which comprises a tube that serves as a sun gear, a planetary gear assembly, and an output member, wherein the tube comprises engagement teeth formed on an outer circumference thereof, the tube being selectively connectable to the shaft, the planetary gear assembly being rotatably mounted on the tube between two ends thereof, the planetary gear assembly being simultaneously meshing with the tube and the internal toothed ring, the output member being arranged at one side of the planetary gear assembly that is opposite to the internal toothed ring, the output member being drivable by the planetary gear assembly.

5. The modularized coaxial gear train reduction mechanism according to claim 4, wherein the planetary gear assembly of the coaxial gear train comprises a first carrier frame and a second carrier frame that are respectively and rotatably arranged at two ends thereof and are opposite to each other, a plurality of planetary gears that are rotatably arranged on a periphery of the tube between the first and second carrier frames, each of the planetary gears comprising a first toothed portion that meshes, simultaneously, with the tube and the internal toothed ring, and each of the planetary gears comprising a second toothed portion meshing with the output member, the output member being rotatably supported on the second carrier frame of the planetary gear assembly.

6. The modularized coaxial gear train reduction mechanism according to claim 5, wherein two ends of the tube respectively and rotatably support the first carrier frame and the second carrier frame of the planetary gear assembly by means of a first bearing and a second bearing.

7. The modularized coaxial gear train reduction mechanism according to claim 5, wherein the second carrier frame of the planetary gear assembly comprises a shaft tube arranged in a center thereof for supporting the output member, and the shaft tube rotatably supports the output member by means of a third bearing.

8. The modularized coaxial gear train reduction mechanism according to claim 5, wherein the first and second carrier frames of the planetary gear assembly are formed, on surfaces thereof that face each other, with a plurality of counterbored hole pillars that abut each other to respectively receive, in a penetrating manner, threaded fastener members that are mutually fastened to each other so as to have the first and second carrier frames arranged on the tube to join to and combine with each other as a unitary structure.

9. The modularized coaxial gear train reduction mechanism according to claim 5, wherein a plurality of shaft bars are arranged between the first and second carrier frames for respectively supporting the planetary gears thereon and each of the shaft bars rotatably supports one of the planetary gears corresponding thereto by means of at least one bearing.

10. The modularized coaxial gear train reduction mechanism according to claim 5, wherein the output member is provided, on an inner circumference thereof, with an internal toothed circumference that meshes with the second toothed portions of the planetary gears and is also provided, on an outer circumference thereof, with a driving toothed portion for driving purposes.

11. A modularized coaxial gear train reduction mechanism using the coupling structure according to claim 2, comprising:

a housing;

a shaft that serves as a transmission shaft and is rotatably mounted in the housing;

an internal toothed ring, which is mounted to the housing;

a coaxial gear train, which comprises a tube that serves as a sun gear, a planetary gear assembly, and an output member, wherein the tube comprises engagement teeth formed on an outer circumference thereof, the tube being selectively connectable to the shaft, the planetary gear assembly being rotatably mounted on the tube between two ends thereof, the planetary gear assembly being simultaneously meshing with the tube and the internal toothed ring, the output member being arranged at one side of the planetary gear assembly that is opposite to the internal toothed ring, the output member being drivable by the planetary gear assembly.

12. The modularized coaxial gear train reduction mechanism according to claim 11, wherein the planetary gear assembly of the coaxial gear train comprises a first carrier frame and a second carrier frame that are respectively and rotatably arranged at two ends thereof and are opposite to each other, a plurality of planetary gears that are rotatably arranged on a periphery of the tube between the first and second carrier frames, each of the planetary gears comprising a first toothed portion that meshes, simultaneously, with the tube and the internal toothed ring, and each of the planetary gears comprising a second toothed portion meshing with the output member, the output member being rotatably supported on the second carrier frame of the planetary gear assembly.

13. The modularized coaxial gear train reduction mechanism according to claim 12, wherein two ends of the tube respectively and rotatably support the first carrier frame and the second carrier frame of the planetary gear assembly by means of a first bearing and a second bearing.

14. The modularized coaxial gear train reduction mechanism according to claim 12, wherein the second carrier frame of the planetary gear assembly comprises a shaft tube arranged in a center thereof for supporting the output member, and the shaft tube rotatably supports the output member by means of a third bearing.

15. The modularized coaxial gear train reduction mechanism according to claim 12, wherein the first and second carrier frames of the planetary gear assembly are formed, on surfaces thereof that face each other, with a plurality of counterbored hole pillars that abut each other to respectively receive, in a penetrating manner, threaded fastener members that are mutually fastened to each other so as to have the first and second carrier frames arranged on the tube to join to and combine with each other as a unitary structure.

16. The modularized coaxial gear train reduction mechanism according to claim 12, wherein a plurality of shaft bars are arranged between the first and second carrier frames for respectively supporting the planetary gears thereon and each of the shaft bars rotatably supports one of the planetary gears corresponding thereto by means of at least one bearing.

17. The modularized coaxial gear train reduction mechanism according to claim 12, wherein the output member is provided, on an inner circumference thereof, with an internal toothed circumference that meshes with the second toothed portions of the planetary gears and is also provided, on an outer circumference thereof, with a driving toothed portion for driving purposes.

18. A modularized coaxial gear train reduction mechanism using the coupling structure according to claim 3, comprising:
   a housing;
   a shaft that serves as a transmission shaft and is rotatably mounted in the housing;
   an internal toothed ring, which is mounted to the housing;
   a coaxial gear train, which comprises a tube that serves as a sun gear, a planetary gear assembly, and an output member, wherein the tube comprises engagement teeth formed on an outer circumference thereof, the tube being selectively connectable to the shaft, the planetary gear assembly being rotatably mounted on the tube between two ends thereof, the planetary gear assembly being simultaneously meshing with the tube and the internal toothed ring, the output member being arranged at one side of the planetary gear assembly that is opposite to the internal toothed ring, the output member being drivable by the planetary gear assembly.

19. The modularized coaxial gear train reduction mechanism according to claim 18, wherein the planetary gear assembly of the coaxial gear train comprises a first carrier frame and a second carrier frame that are respectively and rotatably arranged at two ends thereof and are opposite to each other, a plurality of planetary gears that are rotatably arranged on a periphery of the tube between the first and second carrier frames, each of the planetary gears comprising a first toothed portion that meshes, simultaneously, with the tube and the internal toothed ring, and each of the planetary gears comprising a second toothed portion meshing with the output member, the output member being rotatably supported on the second carrier frame of the planetary gear assembly.

20. The modularized coaxial gear train reduction mechanism according to claim 18, wherein two ends of the tube respectively and rotatably support the first carrier frame and the second carrier frame of the planetary gear assembly by means of a first bearing and a second bearing.

21. The modularized coaxial gear train reduction mechanism according to claim 18, wherein the second carrier frame of the planetary gear assembly comprises a shaft tube arranged in a center thereof for supporting the output member, and the shaft tube rotatably supports the output member by means of a third bearing.

22. The modularized coaxial gear train reduction mechanism according to claim 18, wherein the first and second carrier frames of the planetary gear assembly are formed, on surfaces thereof that face each other, with a plurality of counterbored hole pillars that abut each other to respectively receive, in a penetrating manner, threaded fastener members that are mutually fastened to each other so as to have the first and second carrier frames arranged on the tube to join to and combine with each other as a unitary structure.

23. The modularized coaxial gear train reduction mechanism according to claim 18, wherein a plurality of shaft bars are arranged between the first and second carrier frames for respectively supporting the planetary gears thereon and each of the shaft bars rotatably supports one of the planetary gears corresponding thereto by means of at least one bearing.

24. The modularized coaxial gear train reduction mechanism according to claim 18, wherein the output member is provided, on an inner circumference thereof, with an internal toothed circumference that meshes with the second toothed portions of the planetary gears and is also provided, on an outer circumference thereof, with a driving toothed portion for driving purposes.

* * * * *